US011182562B2

(12) United States Patent
Lee et al.

(10) Patent No.: US 11,182,562 B2
(45) Date of Patent: *Nov. 23, 2021

(54) DEEP EMBEDDING FOR NATURAL LANGUAGE CONTENT BASED ON SEMANTIC DEPENDENCIES

(71) Applicant: International Business Machines Corporation, Armonk, NY (US)

(72) Inventors: Taesung Lee, White Plains, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/537,887

(22) Filed: Aug. 12, 2019

(65) Prior Publication Data
US 2019/0370337 A1  Dec. 5, 2019

Related U.S. Application Data

(63) Continuation of application No. 15/601,016, filed on May 22, 2017, now Pat. No. 10,380,259.

(51) Int. Cl.
*G06F 40/30* (2020.01)
*G06N 3/04* (2006.01)
(Continued)

(52) U.S. Cl.
CPC .............. *G06F 40/30* (2020.01); *G06N 3/04* (2013.01); *G06N 3/0445* (2013.01);
(Continued)

(58) Field of Classification Search
None
See application file for complete search history.

(56) References Cited

U.S. PATENT DOCUMENTS 6,182,028 B1 ‡  1/2001  Karaali ................... G10L 15/18
  704/10
8,706,668 B2 ‡  4/2014  Melvin ................ G06N 99/005
  706/45
(Continued)

OTHER PUBLICATIONS

Cho et al., "Learning Phrase Representations using RNN Encoder-Decoder for Statistical Machine Translation", https://arxiv.org/abs/1406.1078, Sep. 2014.*

(Continued)

*Primary Examiner* — Richard Z Zhu
(74) *Attorney, Agent, or Firm* — Stephen R. Tkacs; Stephen J. Walder, Jr.; Jeffrey S. LaBaw

(57) ABSTRACT

Mechanisms are provided to perform embedding of content of a natural language document. The mechanisms receive a document data object of an electronic document and analyze a structure of the electronic document to identify one or more structural document elements that have a relationship with the document data object. A dependency data structure is generated, representing the electronic document, where edges define relationships between document elements and at least one edge represents at least one relationship between the one or more structural document elements and the document data object. The mechanisms embed the document data object based on the at least one relationship to thereby represent the document data object as a vector data structure. The mechanisms perform natural language processing on the portion of natural language content based on the vector data structure. The one or more structural document elements are non-local non-contiguous with the document data object.

20 Claims, 7 Drawing Sheets

(51) Int. Cl.

| | |
|---|---|
| *G06N 3/08* | (2006.01) |
| *G06N 5/04* | (2006.01) |
| *G06N 5/02* | (2006.01) |
| *G10L 15/18* | (2013.01) |
| *G10L 15/183* | (2013.01) |
| *G10L 15/19* | (2013.01) |
| *G06F 40/295* | (2020.01) |
| *G06F 40/279* | (2020.01) |
| *G06F 40/20* | (2020.01) |
| *G06F 40/289* | (2020.01) |

(52) U.S. Cl.
CPC ............ *G06N 3/0454* (2013.01); *G06N 3/08* (2013.01); *G06N 5/022* (2013.01); *G06N 5/04* (2013.01); *G06F 40/20* (2020.01); *G06F 40/279* (2020.01); *G06F 40/289* (2020.01); *G06F 40/295* (2020.01); *G10L 15/183* (2013.01); *G10L 15/1815* (2013.01); *G10L 15/1822* (2013.01); *G10L 15/19* (2013.01)

(56) References Cited

U.S. PATENT DOCUMENTS

| | | | | |
|---|---|---|---|---|
| 8,935,277 | B2* | 1/2015 | Kuchmann-Beauger | G06F 16/9024 707/769 |
| 9,037,464 | B1‡ | 5/2015 | Mikolov | G06F 17/2785 704/255 |
| 9,659,560 | B2‡ | 5/2017 | Cao | G10L 15/063 |
| 9,846,836 | B2‡ | 12/2017 | Gao | G06N 3/04 |
| 11,048,879 | B2* | 6/2021 | Buhrmann | G06N 5/022 |
| 2002/0078091 | A1* | 6/2002 | Vu | G06F 16/353 715/203 |
| 2008/0168421 | A1‡ | 7/2008 | Meijer | G06F 8/31 717/10 |
| 2011/0125734 | A1‡ | 5/2011 | Duboue | G09B 7/00 707/72 |
| 2011/0270604 | A1‡ | 11/2011 | Qi | G06F 17/271 704/9 |
| 2012/0150532 | A1‡ | 6/2012 | Mirowski | G06F 17/28 704/9 |
| 2012/0159465 | A1* | 6/2012 | Mital | G06F 8/34 717/156 |
| 2012/0253792 | A1‡ | 10/2012 | Bespalov | G06F 17/30707 704/9 |
| 2013/0262501 | A1* | 10/2013 | Kuchmann-Beauger | G06F 16/9024 707/769 |
| 2015/0161996 | A1‡ | 6/2015 | Petrov | G06F 17/30654 704/257 |
| 2015/0293976 | A1‡ | 10/2015 | Guo | G06F 16/248 707/70 |
| 2015/0310862 | A1‡ | 10/2015 | Dauphin | G10L 15/1815 704/25 |
| 2016/0163310 | A1‡ | 6/2016 | Lee | G10L 15/16 704/232 |
| 2016/0350288 | A1‡ | 12/2016 | Wick | G06F 17/2735 |
| 2017/0011289 | A1‡ | 1/2017 | Gao | G06N 3/0472 |
| 2017/0270409 | A1* | 9/2017 | Trischler | G06N 3/0454 |
| 2017/0351749 | A1* | 12/2017 | Quirk | G06F 16/316 |

OTHER PUBLICATIONS

Socher et al., Dynamic pooling and unfolding recursive autoencoders for paraphrase detection. In Advances in Neural Information Processing Systems 24, 2011.*

Socher et al., Parsing Natural Scenes and Natural Language with Recursive Neural Networks. In ICML, 2011.*

Huang et al., Improving Word Representations via Global Context and Multiple Word Prototypes. In: Proc. Association for Computational Linguistics, 2012.*

"Microsoft Research Paraphrase Corpus", Microsoft Corporation, https://www.microsoft.com/en-us/download/details.aspx?id=52398, Last Published Mar. 3, 2015, accessed online Feb. 15, 2018, 6 pages.‡

Chung, Junyoung et al., "Empirical Evaluation of Gated Recurrent Neural Networks on Sequence Modeling", Cornell University, arXiv:1412.3555v1 [cs.NE], Dec. 11, 2014, 9 pages.‡

Clark, Kevin et al., "Improving Coreference Resolution by Learning Entity-Level Distributed Representations", In Association for Computational Linguistics (ACL), Jun. 2016, 11 pages.‡

Conneau, Alexis et al., "Supervised Learning of Universal Sentence Representations from Natural Language Inference Data", In The Conference on Empirical Methods on Natural Language Processing (EMNLP), arXiv:1705.02364v4 [cs.CL], submitted version from arXiv:1705.02364v4 [cs.CL], Jul. 21, 2017, 12 pages.‡

Duchi, John et al., "Adaptive Subgradient Methods for Online Learning and Stochastic Optimization", Journal of Machine Learning Research, Jul. 12:2121-2159, Feb. 1, 2011, 39 pages.‡

Gan, Zhe et al., "Learning Generic Sentence Representations Using Convolutional Neural Networks", Proceedings of the 2017 Conference on Empirical Methods in Natural Language Processing, Jan. 2017, 11 pages.‡

High, Rob, "The Era of Cognitive Systems: An Inside Look at IBM Watson and How it Works", IBM Corporation, Redbooks, Dec. 12, 2012, 16 pages.‡

Hochreiter, Sepp et al., "Long Short-Term Memory", Neural Computation 9(8): 1735-1780, Nov. 15, 1997, 32 pages.‡

Iyyer, Mohit et al., "A Neural Network for Factoid Question Answering over Paragraphs", Proceedings of the 2014 Conference on Empirical Methods in Natural Language Processing (EMNLP), Oct. 25-29, 2014, 12 pages.‡

Kalchbrenner, Nal et al., "A Convolutional Neural Network for Modelling Sentences", Proceedings of the 52nd Annual Meeting of the Association for Computational Linguistics (ACL), Jun. 23-25, 2014, pp. 655-665.‡

Kim, Yoon, "Convolutional Neural Networks for Sentence Classification", Proceedings of the 2014 Conference on Empirical Methods in Natural Language Processing, (EMNLP), Oct. 25-29, 2014, pp. 1746-1751.‡

Kiros, Ryan et al., "Skip-Thought Vectors", Advances in Neural Information Processing Systems 28 (NIPS 2015), Dec. 7-12, 2015, pp. 1-9.‡

Kusner, Matt J. et al., "From Word Embeddings to Document Distances", Proceedings of the 32nd International Conference on Machine Learning (ICML), Jul. 6-11, 2015, pp. 957-966.‡

Le, Quoc V. et al., "Distributed Representations of Sentences and Documents", Proceedings of the 31st International Conference on Machine Learning, vol. 14, Jun. 21-26, 2014, 9 pages.‡

Levy, Omer et al., "Dependency-Based Word Embeddings", Proceedings of the 52nd Annual Meeting of the Association for Computational Linguistics (Short Papers), Jun. 23-25, 2014, pp. 302-308.‡

Ma, Mingbo et al., "Dependency-based Convolutional Neural Networks for Sentence Embedding", Proceedings of the 53rd Annual Meeting of the Association for Computational Linguistics and the 7th International Joint Conference on Natural Language Processing (Short Papers), vol. 2, Jul. 26-31, 2015, pp. 174-179.‡

Mikolov, Tomas et al., "Distributed Representations of Words and Phrases and their Compositionality", Proceedings of the 26th International Conference on Neural Information Processing Systems (NIPS'13), Dec. 5-10, 2013, pp. 1-9.‡

Mikolov, Tomas et al., "Efficient Estimation of Word Representations in Vector Space", International Conference on Learning Representations (ICLR), May 2-4, 2013, submitted version from arXiv:1301.3781v3 [cs.CL], Sep. 7, 2013, 12 pages.‡

Palangi, Hamid et al., "Deep Sentence Embedding Using Long Short-Term Memory Networks: Analysis and Application to Information Retrieval", Proceedings of IEEE/ACM Transactions on Audio, Speech and Language Processing (TASLP), 24(4):694-707, Jan. 21, 2016, submitted version from arXiv:1502.06922v3 [cs.CL], Jan. 16, 2016, 25 pages.‡

(56) References Cited

OTHER PUBLICATIONS

Pennington, Jeffrey et al., "GloVe: Global Vectors for Word Representation", Proceedings of the 2014 Conference on Empirical Methods in Natural Language Processing (EMNLP), Oct. 25-29, 2014, pp. 1532-1543.‡

Socher, Richard et al., "Parsing Natural Scenes and Natural Language with Recursive Neural Networks", Proceedings of the 28th International Conference on Machine Learning (ICML), Jun. 28-Jul. 2, 2011, 8 pages.‡

Tai, Kai Sheng et al., "Improved Semantic Representations From Tree-Structured Long Short-Term Memory Networks", Proceedings of the 53rd Annual Meeting of the Association for Computational Linguistics and the 7th International Joint Conference on Natural Language Processing (Short Papers), Jul. 26-31, 2015, pp. 1556-1566.‡

Wieting, John et al., "Revisiting Recurrent Networks for Paraphrastic Sentence Embeddings", Proceedings of the 55th Annual Meeting of the Association for Computational Linguistics, Jul. 30-Aug. 4, 2017, submitted version from arXiv:1705.00364v1 [cs.CL], Apr. 30, 2017, 12 pages.‡

Yuan, Michael J., "Watson and healthcare, How natural language processing and semantic search could revolutionize clinical decision support", IBM Corporation, IBM developerWorks, http://www.IBM.com/developerworks/industry/library/ind-watson/, Apr. 12, 2011, 14 pages.‡

"List of IBM Patents or Patent Applications Treated as Related", Aug. 12, 2019, 2 pages.

Conneau, Alexis et al., "Supervised Learning of Universal Sentence Representations from Natural Language Inference Data", In The Conference on Empirical Methods on Natural Language Processing (EMNLP), submitted version from arXiv:1705.02364v4 [cs.CL], Jul. 21, 2017, 12 pages.

Duchi, John et al., "Adaptive Subgradient Methods for Online Learning and Stochastic Optimization", Journal of Machine Learning Research, Jul. 12:2121-2159, Feb. 1, 2011, 30 pages.

Iyyer, Mohit et al., "A Neural Network for Factoid Question Answering over Paragraphs", Proceedings of the 2014 Conference on Empirical Methods in Natural Language Processing (EMNLP), Oct. 25-29, 2014.

\* cited by examiner
‡ imported from a related application

DEEP EMBEDDING FOR NATURAL LANGUAGE CONTENT BASED ON SEMANTIC DEPENDENCIES

BACKGROUND

The present application relates generally to an improved data processing apparatus and method and more specifically to mechanisms for performing deep embedding for natural language content based on identified semantic dependencies.

Word embedding is the collective name for a set of language modeling and feature learning techniques in natural language processing (NLP) where words or phrases from a vocabulary are mapped to vectors of real numbers. Word embedding is used by NLP systems as one mechanism for reasoning over natural language sentences. Without word embedding, an NLP system operates on strings of characters, similar groups of words can be considered differently by the NLP system. For example, "The President of the United States visited New York City last week" and "Mr. Trump came to NYC on May 4" have high semantic similarity, but low string similarity. Thus, through word embedding, these sentences may be translated into vectors, e.g., [0.92, 0.1, ..., 0.1] and [0.91, 0.1, ..., 0.1], such that their semantic similarity becomes much more readily apparent to a NLP system when comparing the vector representations.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising a processor and a memory, the memory comprising instructions that are executed by the processor to configure the processor to implement a natural language embedding engine. The method comprises receiving, by the natural language embedding engine executing on the processor, a document data object of an electronic document, and analyzing, by the natural language embedding engine, a structure of the electronic document to identify one or more structural document elements that have a relationship with the document data object. The method further comprises generating, by the natural language embedding engine, a dependency data structure representing the electronic document. Edges in the dependency data structure define relationships between document elements. At least one edge is generated in the dependency data structure to represent at least one relationship between the one or more structural document elements and the document data object.

The method also comprises executing, by the natural language embedding engine, an embedding operation on the document data object based on the at least one relationship in the dependency data structure to thereby represent the document data object as a vector data structure. Furthermore, the method comprises performing, by a natural language processing engine executing in the data processing system, a natural language processing operation on the portion of natural language content based on the vector data structure. The one or more structural document elements comprise one or more structural document elements that are non-local non-contiguous with the document data object.

In other illustrative embodiments, a computer program product comprising a computer useable or readable medium having a computer readable program is provided. The computer readable program, when executed in a data processing system, causes the data processing system to perform various ones of, and combinations of, the operations outlined above with regard to the method illustrative embodiment.

In yet another illustrative embodiment, a system/apparatus is provided. The system/apparatus may comprise one or more processors and at least one memory coupled to the one or more processors. The at least one memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
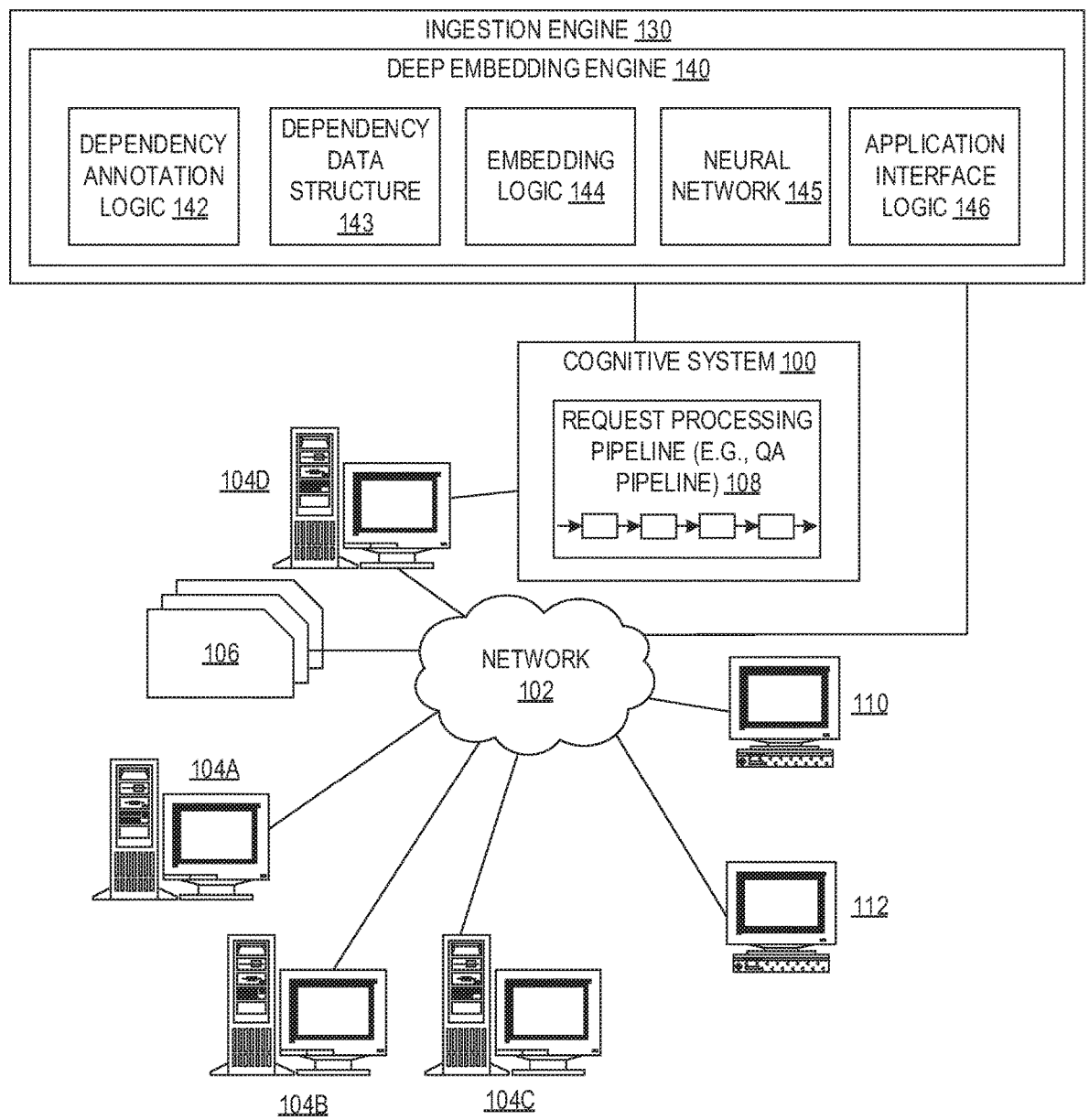
FIG. 1 depicts a schematic diagram of one illustrative embodiment of a cognitive system in a computer network.

The illustrative embodiments provide mechanisms for performing embedding on natural language content based on identified non-contiguous long distanced semantic dependencies and also optionally based on contiguous dependencies. In cognitive computing systems, such as in the case of the IBM Watson™ cognitive computing system, where natural language processing is performed on unstructured data, e.g., natural language content, there is an increasing demand for deep semantic understanding of the unstructured data since a proper understanding of natural language not only involves capturing the semantics of natural language, but also the meaning of the natural language content, which often depends on the context. For example, the term "McIntosh" has different meanings in the context of farming, Apple corporation Products, or audio products. Similarly, the phrase "It should take off soon" may have different meanings based on the context of a discussion about an airplane or a business. To address such issues, a deep semantic understanding of the relationships or dependencies of the natural language data objects, e.g., words, sentences, figures, etc. is needed.

There are many challenging tasks to achieve deep semantic understanding. Some of these challenges include word sense disambiguation, coreference resolution, entity and event resolution, and the like. A key technology underlying solutions to these challenges is to represent language data objects, e.g., words, sentences, and images, as one or more values that machines can easily perform operations on, so that the machine can measure semantic similarity and utilize that semantic similarity to perform cognitive operations within the computing environment to assist human beings. This technique, known as "embedding", shows improvements in semantic representation of data objects and thus, in measuring semantic similarities between such data objects. Embedding is a technology that represents words, sentences, or other portions of textual content into a numerical representation, such as a vector representation that machine learning algorithms are able to utilize. Embedding maps words or phrases from a vocabulary to a corresponding vector of real numbers which provides the advantages of improved dimensionality reduction and contextual similarity when compared to other approaches, such as the "bag or words" approach. An overview of embedding may be found at the SlideShare website as the presentation slide deck authored by Bhaskar Mitra, entitled "A Simple Introduction to Word Embeddings," published on Apr. 5, 2016.

Word embedding is used for semantic parsing to extract meaning from text to enable natural language understanding. That is, for a natural language processing model to be able to predict the meaning of text, the model needs to be aware of the contextual similarity of words or sentences. For example, through contextual similarity, it may be determined that plat words, such as flower, tree, etc., are found in sentences that reference concepts such as "grown," "eaten," "cut," and "picked", whereas such concepts are not generally associated with words such as "airplane." The vector representations created by word embedding techniques preserve these similarities such that words that regularly occur nearby in text will also be in close proximity in vector space.

Thus, word embedding builds a low-dimensional vector representation from a corpus of text, which preserves the contextual similarity of words. Embedding technology provides capabilities to capture more accurate semantic relatedness and improve various tasks relying on semantic understanding, such as analogy identification, coreference resolution, entity resolution, and paraphrase detection. For example, the semantic similarity of two words can be measured by the similarity between their respective embedded vectors.

Similar technology can be applied to sentence embedding. Recent approaches on sentence embedding leverage neural networks. Existing neural network models for sentence embedding broadly fall into two classes, supervised models optimized for a particular application and unsupervised methods applying unsupervised word embedding techniques to the sentence level. The drawback of supervised embedding is that these approaches optimize the weights of a neural network based on the class labels in the training data and thus, the models are optimized for the given task and data and may not generalize to different tasks, i.e. the training is label specific. Unsupervised embedding techniques produce sentence vectors without relying on labels. However, existing techniques learn sentence representations only using local contexts appearing in contiguous local regions.

One popular extension of existing word representation approaches represents sentences using an average of words, or "bag of words", in the sentence, e.g., see the word2vec approach described in Mikolov et al., "Distributed Representations of Words and Phrases and Their Compositionality," Advances in Neural Information Processing Systems, 2013. However, a bag of words approach, such as this, has clear limitations, such as not being able to distinguish "a cat eats a mouse" from "a mouse eats a cat" since the sentence is merely a collection of words in the bag or words approach and both sentences have the same collection of words.

Another approach, described in Kiros et al., "Skip-thought Vectors," Advances in Neural Information Processing Systems, 2015, exploits a chain of long short term memory (LSTM) cells to encode a sentence as an ordered sequence of words so that the embedding can predict the sequence of the words in the next or previous sentence. This approach learns the context, which in this implementation is limited to the next or previous sentence. Thus, for the embedding, no labeled data specific to a task is required, yet it is shown to perform well on diverse tasks such as semantic relatedness, and paraphrase detection. Still another approach, described in Le et al., "Distributed Representations of Sentences and Documents," ICML, volume 14, 2014, uses a simple paragraph index similar to word2vec to learn to predict the next word.

While these approaches do not require labeled data, these existing approaches only consider sequential contexts and do not consider diverse long distance dependencies, i.e. dependencies with non-contiguous portions of text or structural elements of the natural language content. For example, consider the following paragraph:

Dridex Campaign Moves Toward U.S.
The Dridex web fraud malware had recently focused on banks in the United Kingdom. [But the new campaign targets those in the United States.]

In this paragraph, the "United States" in the brackets is difficult to predict without using a dependency with the title "Dridex Campaign Moves Toward U.S."

Recently, a few other approaches, such as described in Ma et al. "Dependency-based Convolutional Neural Networks for Sentence Embedding," Proceedings of the $53^{rd}$ Annual Meeting of the Association for Computational Linguistics and the $7^{th}$ International Joint Conference on Natural Language Processing, vol. 2, 2015; Tai et al, "Improved Semantic Representations from Tree-Structured Long Short-Term Memory Networks," arXiv preprint aXiv: 1503.00075 (2015); and Iyyer et al., "A Neural Network for Factoid Question Answering over Paragraphs," EMNLP, 2014, leverage the dependency tree of a sentence to capture long distance relationships among words within a sentence. However, there are several limitations of these approaches. First, they focus on dependency within a sentence, and do not consider extra-sentence dependencies. Second, they are trained for specific goals using labeled data requiring extensive human labor for each application domain.

Thus, there are several limitations with embedding techniques. Many embedding techniques, such as word2vec (skip-gram), use a fixed local and contiguous context for embedding, such as k previous words or sentences. However, local contexts are not always semantically related to the target object, and more relevant contexts may appear in more distant locations that are not included in the k previous words or sentences. For example, in natural language documents, document structures, e.g., titles, chapters, paragraphs, figures, etc., often provide contextual dependency information.

Take, for example, the following portion of text:

Tensorflow supports the majority of popular neural networks:
Multilayer perceptron.
Conventional layer.
Recurrent neural network.
It also supports fast computation using C library under t hood. Its installation is also easy.

The fifth sentence in this example, i.e. "It also supports fast computation using C library under the hood" is more relevant to the first sentence than the previous sentence. The sixth sentence is also associated with the first sentence.

The Ma et al. mechanism presents a method for sentence embedding using non-contiguous local context in which, instead of using k previous words as the context, the Ma et al. mechanism first parses each sentence using a dependency parser and uses the ancestors and siblings of a word in the parse tree as the word's context. Despite the use of non-contiguous local context, i.e. within a sentence, the approach does not consider non-local context such as other sentences, images, and external knowledge. Since it does not capture non-local context, the Ma et al. mechanism may not correctly understand ambiguous words or sentences as pragmatics has suggested. For example, in sentiment analysis, "it is very small" may be a positive comment for a smart phone, but a negative one for a house, and the Ma et al. mechanism cannot distinguish the two. Also, a list item may have less influence to the next list item than the introductory sentence starting the list.

Furthermore, these mechanisms do not recognize that structural dependencies with other non-local non-contiguous contexts, and external knowledge sources, may aid the determination of embedded representations of natural language text data objects, such as words, sentences, or the like. For example, these mechanisms do not take into consideration that the title of a document can be related to all sentences in the documents, and a section title can affect all sentences within that section. Similarly, a caption of figures or tables may be strongly related to the figure or table. A sentence referring to a figure or table may also rely on the figure or table itself, or the caption associated with the figure or table. Thus, it would be beneficial to have a mechanism to identifies these non-local non-contiguous structural dependencies within or among natural language text data objects, or document structural elements, and use these related elements to embed the target object, e.g., word, sentence, etc. Moreover, it would be beneficial to have a mechanism that identifies external knowledge base information that aids in the embedding and using that information to perform embedding.

It should be appreciated that within the present description, the e following understanding of various terms is used throughout:

1. Contiguous dependencies: Given a sequence of words or sentences [ ..., s(t−1), s(t), s(t+1), ... ] in a sentence or a document, a set [s(t−d)|d=−p, ..., 0, ..., q, and p>0, q>0] comprises a set of words or sentences having contiguous dependencies;
2. Non-contiguous dependencies: the complement of contiguous dependencies;
3. Extra-document dependencies: dependencies with content existing outside of the document in which the sentence being embedded exists;
4. Intra-sentence dependency: those dependencies among words or characters within a sentence;
5. Extra-sentence dependency: those dependencies among sentences; and
6. Long distance dependences (or "long dependencies"): dependencies with content and/or structure that includes non-contiguous extra-sentence dependencies and/or extra-document dependencies.

The illustrative embodiments provide mechanisms for performing embedding of unstructured data, such as text and images, based on non-contiguous, long distanced, contexts and their dependencies extracted from the document structure and inter-sentence structure. The embedding mechanisms incorporate semantical relevant contexts to produce more accurate semantic representations and improve the performance of natural language processing (NLP) algorithms, such as coreference resolution, paraphrase identification, word analogy test, etc., which may in turn be used by cognitive systems to perform cognitive operations. It should be appreciated that the term "embedding" is utilized in the industry, and herein, to refer to both the method of representing a non-numerical data object as one or more numerical values, such as a vector number representation, and also the results of such a method. Thus, an "embedding" may be the resulting numerical representation of the non-numerical data object generated by an "embedding" method.

With the mechanisms of the illustrative embodiments, both contiguous local context and non-contiguous, long-distanced, contexts providing dependencies are evaluated to perform embedding, i.e. representing a natural language text data object, e.g., a word, sentence, or other portion of text, as a vector representation having a plurality of vector elements that comprise values indicative of context information for the natural language text data object. Contrary to techniques that only utilize neighboring words or sentences in contiguous local portions of textual content as the context for performing embedding, the mechanisms of the illustrative embodiments detect the structure of natural language content, e.g., a document, and identifies other portions, or units, of textual content, e.g., sentences, titles, section headers, etc. that may semantically influence the target natural language text data object for performing embedding. For example, as noted above, the title of a document may provide contextual influence on all the sentences in the document, a section title may have contextual influence on all the sentences in a section, captions of figures and tables may have contextual influence on the figures/tables, a sentence referring to a figure or table may also provided contextual influence information for the figure or table, etc. The mechanisms of the illustrative embodiments detect these structural dependencies among document elements and use the related elements to embed the target natural language text data object, e.g., word, sentence, or other portion of natural language content.

As a further aspect of the illustrative embodiments, the mechanisms of the illustrative embodiments may incorporate external knowledge sources, such as lexicons, knowledge bases, hyperlinks, etc., to assist with providing contextual information for assisting with the embedding process. For example, the mechanisms of the illustrative embodiments may discover the embedding of a natural language text object, e.g., a word, using other words appearing in the definition of the word or lexicon. Similarly, if a knowledge base contains a word or an entity, the mechanisms of the illustrative embodiments may include the entries and relationships in the knowledge base entry in the actual embedding. Hyperlinks, citations, or other references found in a document may be used to extend the context of the natural language text data object being embedded by looking at the natural language content of the target of the hyperlink, i.e. the other document to which the present document is linked by the hyperlink. These knowledge sources provide deeper semantic information about the natural language text data object being embedded, referred to hereafter as the "target object" which can be any portion of natural language text such as a word, a phrase, a sentence, or any other amount of natural language textual content, than merely looking at the contiguous local context of the target object.

For example, looking at the example paragraph mentioned above again, the illustrative embodiments may improve upon the accuracy of coreference resolution in that the first "It" in the fifth sentence may be properly associated with "Tensorflow" rather than "recurrent neural network", which is difficult for a model based on sequential sentences of a local contiguous portion of text to determined due to the many words/sentences between the word "Tensorflow" and the word "It" in this paragraph. Moreover, since the illustrative embodiments further add dependency knowledge from external sources, such as a knowledge base that indicates that Tensorflow is a tool, and a tool has a property of "installation", the illustrative embodiments may improve the understanding of the term "Its."

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for performing embedding on natural language content based on identified non-contiguous long distanced semantic dependencies and information obtained from external knowledge sources. The illustrative embodiments leverage the structure of a document to assist with the embedding process. That is, just as a word is defined by its context in the sentence, a sentence may be further defined by its context within the document. However, the document is not a mere sequence of sentences, just as a sentence is not merely a collection of words. Unlike existing approaches using the local contiguous portion of text of preceding and following sentences as a local context, the illustrative embodiments utilize long distance, non-contiguous, dependencies, such as various elements of the document structure, to define the context for performing word and/or sentence embedding. Examples of the document dependencies and related elements include a dependency of titles to words/sentences, dependencies of tables to words/sentences, dependencies of figures to words/sentences, parallel structure dependencies (e.g., lists), and dependencies based on links, citations, or other references to other documents.

With the illustrative embodiments, a natural language text data object, e.g., word, sentences, or other portion of text, may be accurately modeled based on a flow of text understanding. Consider the following as an example portion of text (where sentences are labeled (a)-(c) for ease of reference: "(a) National Farm offers several products. (b) First, it serves insurance plans. (c) Second, it offers financial solutions." The sentences (b) and (c) are only weakly related, and thus the existing approach predicting (c) to embed (b) would have difficulty finding their relations. In contrast, the illustrative embodiments predict (c) to embed (a) to correctly generate the context.

In addition to the above, current natural language understanding ignores dependencies of non-textual elements such as figures, tables, and links to external documents. In some illustrative embodiments set forth herein, the mechanisms of the illustrative embodiments also consider dependencies with these non-textual elements by not only embedding natural language text data objects, such as words, sentences, and other portions of text, but also other document elements in the document which may be non-textual elements.

Figure 2:
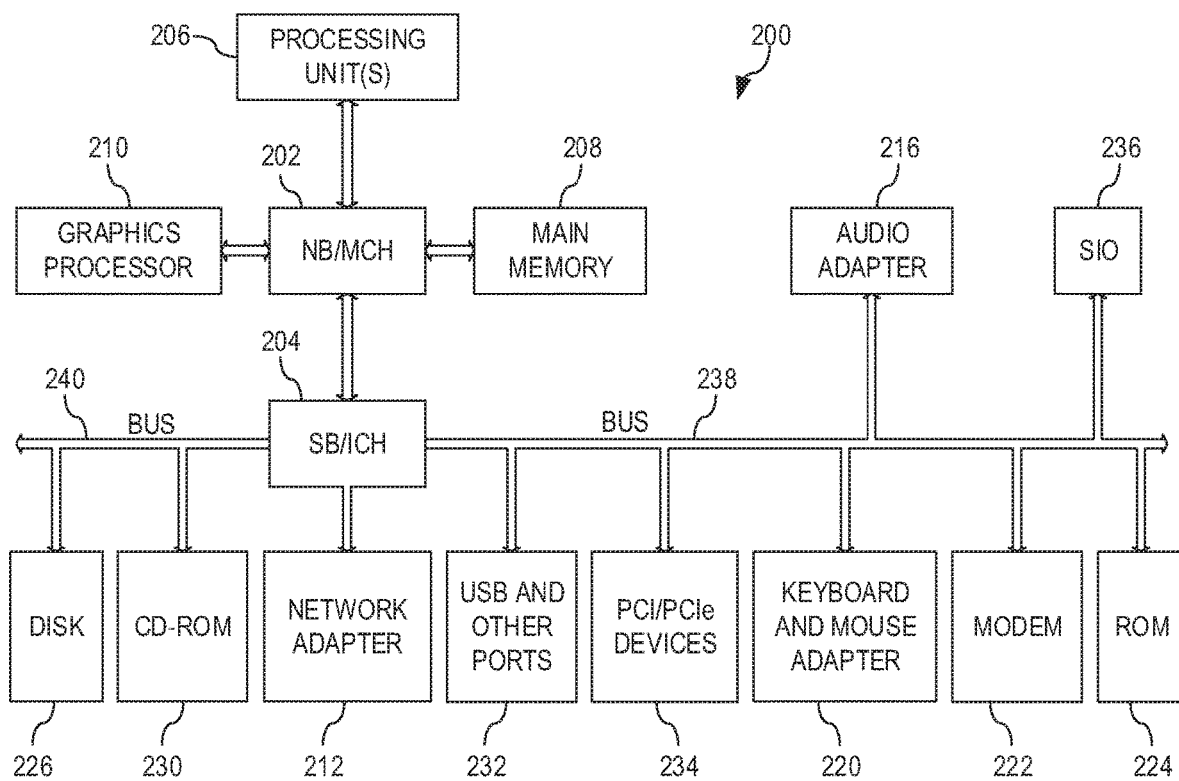
FIG. 2 is a block diagram of an example data processing system in which aspects of the illustrative embodiments are implemented.
Figure 3:
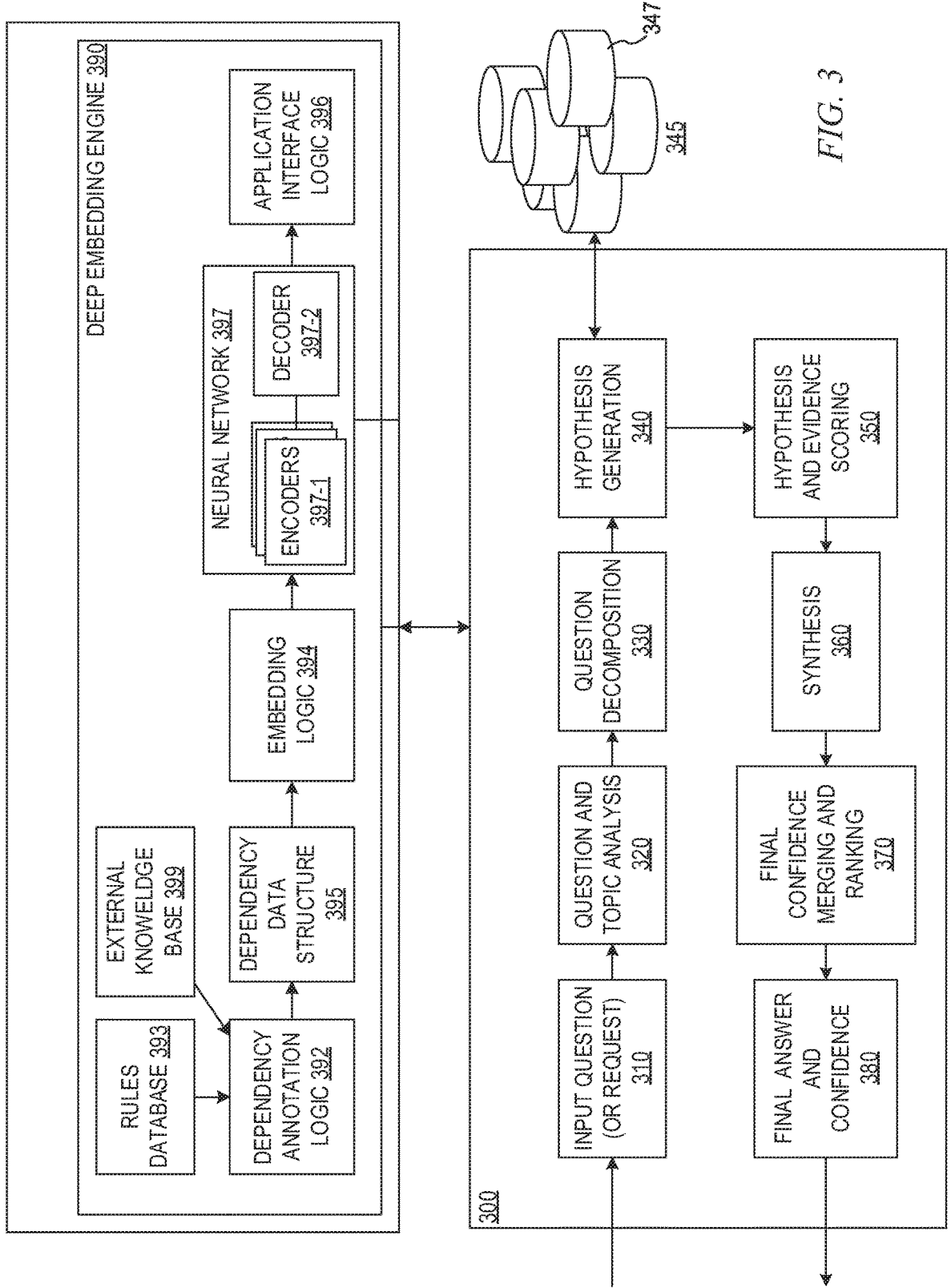
FIG. 3 illustrates a cognitive system processing pipeline for processing a natural language input to generate a response or result in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for performing a cognitive operation based on natural language processing of electronic documents. The example cognitive system implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. The particular application that is implemented in the cognitive system may be any type of application in which a cognitive operation is performed. For example, the application and cognitive operation may be directed to general question answering, medical diagnosis support, medical treatment recommendations, accounting cognitive operations, or any other domain or subject matter area where cognitive operations that emulate human thought and involve natural language processing may be utilized. Other examples include key language processing tools such as paraphrase mining, entity resolution utilizing embedded sentences to compare sentences to identify similarities or mentioned nouns or noun-phrase similarity.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a patient medical condition diagnosis cognitive operations while a second request processing pipeline may be directed to accounting of business decision support cognitive operations. In other cases, for example, the request processing pipelines may be configured to provide different types of cognitive functions or support different types of applications, such as one request processing pipeline being used for patient medical condition diagnosis or monitoring, and a second request processing pipeline directed to patient treatment recommendation generation, or the like.

Moreover, each request processing pipeline may have their own associated corpus or corpora that, they ingest and operate on, e.g., one corpus for medical condition diagnosis and treatment documents and another corpus for accounting or business decision support related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system with regard to performing aspects of natural language processing in which deep embedding of natural language text data objects, e.g., words, phrases, sentences, or other portions of text, are performed. In some illustrative embodiments, additional embedding of non-textual data objects of electronic documents may also be performed, as discussed hereafter. The natural language processing and deep embedding may be performed when ingesting an electronic document from a corpus for use by the cognitive system when performing its cognitive operations. Thus, the mechanisms of the illustrative embodiments may operate as a pre-processor to the natural language content utilized by the cognitive system to perform question answering or request processing.

Thus, it is important to first have an understanding of how cognitive systems, and question and answer creation in a cognitive system implementing a QA pipeline in which natural language processing is utilized, is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate a ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. For example, in the case of an embodiment directed to healthcare based cognitive systems, this analysis may involve processing patient medical records, medical guidance documentation from one or more corpora, and the like, to provide a healthcare oriented cognitive system result.

In the context of the present invention, cognitive system 100 may provide any desired cognitive functionality and cognitive operations for the preferred domain or subject matter implementation. For purposes of illustration, it will be assumed that the cognitive system 100 is implemented as a healthcare based cognitive system that operates to perform cognitive analysis operations for evaluating patient medical records, medical guidance and other medical condition and treatment oriented electronic documents in one or more electronic corpora, and generate one or more medical treatment recommendations for a patient based on the cognitive analysis operations. For example, depending upon the particular implementation, the healthcare based cognitive system may perform cognitive operations comprising one or more of patient diagnostics, medical treatment recommendation systems, medical practice management systems, personal patient care plan generation and monitoring, patient electronic medical record (EMR) evaluation for various purposes, such as for identifying patients that are suitable for a medical trial or a particular type of medical treatment, or the like. Thus, the cognitive system 100 may be a healthcare cognitive system 100 that operates in the medical or healthcare type domains and which may process requests for such healthcare operations via the request processing pipeline 108 input as either structured or unstructured requests, natural language input questions, or the like. It should be appreciated that while a healthcare cognitive system will be utilized as one example of a cognitive system 100 for purposes of the present description, the illustrative embodiments are not limited to such and as noted above, any cognitive system for any domain or subject matter context may be used in embodiments of the cognitive system 100 without departing from the spirit and scope of the present invention.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a deep embedding engine 140 of an electronic corpus ingestion engine 130. The ingestion engine 130 receives electronic documents of a corpus and performs analysis of the natural language content of the electronic documents to annotate and embed the natural language content so that it may be more readily useable by the cognitive system 100 when performing cognitive operations for answering questions and/or responding to requests, as discussed hereafter. The deep embedding engine 140 performs operations of one or more of the illustrative embodiments described herein to embed natural language text data objects, e.g., words, phrases, sentences, or other portions of textual content, and/or non-textual data objects, such as figures, tables, and the like, where the embedding operation results in a vector representation of the corresponding natural language text data object or non-textual data object (referred to also collectively as document data objects) of the electronic document. The embedded natural language content may then be utilized by the cognitive system, such as natural language processing elements of the cognitive system, to perform various operations including coreference resolution, paraphrase detection, word sense disambiguation, entity and event resolution, opinion mining, semantic relatedness, image-sentence ranking, image generation from text, story generation, subjectivity/objectivity classification, question-type classification, and the like. For example, the numerical representations (vectors) in the embedded natural language content may be used in diverse NLP applications including Question and Answer (QA) systems, such as by finding a mapping from question vector to answer vector, semantically similar sentence mining (using vector similarity), and the like. As the illustrative embodiments may express the non-numerical data objects of natural language content, i.e. the non-textual data objects and natural language text data objects, as a vector representation of numerical values, any machine learning tools that process such a numerical representation may be utilized with the mechanisms of the illustrative embodiments. These machine learning tools may be classified into a first class of tools that are concerned with sentence, image, answer, etc. generation, a second class of tools that are concerned with semantic (sentiment, opinion polarity, property, etc.) classification, and a third class of tools that are concerned with vector space operations, such as similarity analysis, analogy identification, and the like.

The operation of the deep embedding engine 140 may be thought of as operating using three layers of functionality. The first layer of functionality is dependency annotation which is performed by the dependency annotation logic 142. The second layer of functionality is an embedding layer functionality performed by the embedding logic 144 and neural network 145. The third layer of functionality is an application specific interface functionality performed by application interface logic 146.

The dependency annotation logic 142 creates, for an electronic document being ingested, labeled directed edges in a dependency data structure 143 (which may be an directed acyclic graph, for example) associated with the electronic document, over natural language text data objects or non-text data objects in the electronic document, referred to herein collectively as "document elements" which may include words, sentences, figures, tables, hyperlinks, facts from a knowledge base, or the like. An edge is represented by a tuple (x, label, y) and is directed, meaning "x generates/governs y as label" or "y depends on x for label." Edges represent dependencies, where dependencies between words may be defined by a dependency parser or rule based mechanism. Other dependencies between other types of document elements can be either defined by rule-based mechanisms, learned through a machine learning technique, such as that used in sequence labeling to identify text data objects and non-text data objects, or those used in dependency parsing, or the like.

Examples of possible rule-based dependencies are as follows. Rules are established that specify that each sentence in a document depends on the title of the document. Similarly, rules may be defined that specify that a section title has similar influences in that sentences within a section of an electronic document are dependent upon the section title. Rules specifying sentences as also have sequential dependency, where a following sentence depends on the preceding sentence, may also be utilized. Rules specifying more fine-grained distinctions, such as using contrastive conjunctions (e.g., but), are also implemented and evaluated. Some rules may be provided that identify a footnote as being different from the regular sequential dependency and thus, are separately defined in the rule-based dependency mechanism. Rules for identifying and evaluating parallel structures, such as a bulleted list, may be implemented, such as rules that identify parallel structures by bullets, indentation, and keywords (e.g., first, second, last, . . . ). Dependency edges may be created from a parallel structure topic sentence, e.g., the sentence right before a bulleted list, to each parallel items in the bulleted list.

Moreover, given a table or figure reference such as "above figure" or "Table I," the rule based mechanism may link a sentence with the corresponding figure or table. Furthermore, rules for identifying and evaluating hyperlinks, or well-known article mentions, may be provided and used to create an edge from an external document and its content to the document element being ingested.

The rules may be defined in a variety of different ways. For example, some rules may be defined in terms of metadata of an electronic document, such as looking for particular metadata tags in the electronic document. Some rules may be based on pattern recognition or regular expressions in which predefined patterns are specified and matched to natural language text or other non-textual document elements. Some rules may be defined in terms of entity mentions, such as based on a lexicon or knowledge graph. Of course some rules may combine various mechanisms for defining the rules. Some example implementations of the rules are as follows. In case of HTML documents, the illustrative embodiments may use a "<title>X</title>" tag to identify the document title, and add a dependency of the type (X, document title, Y) for each sentence in the document. Similarly, the illustrative embodiments may use a tag of the type "<H1>C</H1>" to discover a dependency of (C, section title, Y) for each sentence Y in the range from C to the next <H1> tag. The illustrative embodiments may also use visual locations and font sizes to find such dependencies. Patterns and/or tags for bulleted list may also be used to define rules that specify certain bullet characters to identify dependencies of list items to their corresponding introductory sentence for the bulleted list.

Thus, in some illustrative embodiments, the dependency annotation logic 142 may identify document titles and section titles using a rule-based mechanism and associate document titles with every sentence in the document and section titles with every sentence appearing in the section, via an edge representation in a directed acyclic graph. For example, the rule may specify that a title is a sole sentence, preceded and/or followed by an empty line, that it may have a larger font size than body text, that it may have a particular metadata tag, that it may have boldface or all capital letters, or any other pattern representative of a title that is recognizable by the mechanisms of the illustrative embodiments. Thereafter, the identified titles may be used to generate directed edges associating the title with each sentence in the document, in the dependency data structure for the electronic document, where this edge may be used, along with other context information, to perform embedding of each of these sentences.

Similar approaches may be used for section titles where the section title is associated with sentences present within the section as opposed to the entire document. Thus, a portion of natural language content may have edges between a title of a document and the portion, and a title of the section and the portion.

In addition, rules may be established for identifying footnotes with sentences. For example, one possible rule may specify a pattern of "<sup>###</sup>, style name" that indicates a tag pattern indicative of a footnote representation in natural language content. Thereafter, a corresponding directed edge between the footnote and the sentence that is referenced by the footnote may be generated in the dependency data structure and used, along with other context information, to embed the sentence.

As a further example of long distanced non-contiguous dependencies, rules may be established for identifying and generating edges in the dependency data structure for non-non-contrastive conjunctions/conjunctive adverbs, such as terms like "but" (contrast), "so" (consequence), "instead" (alternation), "in comparison" (comparison), and the like. Moreover, rules may be defined for identifying and generating edges directed to parallel structures. For example, patterns may be established of the type to identify instances of "first, . . . , second, . . . ", a pattern of "If . . . If . . . Otherwise/or", "One . . . Another . . . ", " . . . Also, . . . " or any other patterns that are determined to be indicative of a parallel structure.

Furthermore, rules may be established for identifying lists and generating corresponding edges in the dependency data structure that correlate introductory text of a list structure with each of the list items. For example, the patterns recognized by such rules may include items following a colon, shared formats across lines (such as bullets, indentations, fonts, etc.). Moreover, rules may be established for identifying image/table references within text, via explicit references/addressing of figures, images, pictures, tables, or the like, and thereby generate an association in the dependency data structure based on a pattern of a rule, e.g., a pattern of "above figure/image/picture/table" or "following figure/image/picture/table". Other patterns may look for textual patterns such as "Figure 1", "Table VI", or the like. It should be appreciated that such references may be remotely located from the figure, image, picture, table, or the like. Other rules may identify hyperlinks, citations, and other types of references to other documents based on patterns, metadata tags, and the like, and corresponding directed edges may be generated in the dependency data structure.

In addition, the dependency annotation logic 142 of the embedding engine 140 may also use knowledge base information to better define the dependency. That is, understanding of a portion of a document, such as a sentence, requires not only its context, but also some background knowledge, such as knowledge that may be present in a knowledge base. Such background knowledge also is a type of dependency associated with the document element, such as a sentence. Therefore, the dependency annotation logic 142 may add a link (or edge) between a fact object (e.g., relation triples like (Obama, was born in, Hawaii)) from the knowledge base and a document element (e.g., word, sentence, table, figure, etc.) in an electronic document being ingested. To choose which fact objects to link with a document element, the dependency annotation logic 142 may use machine learning, such as a supervised machine learning approach, or a rule-based approach (e.g., top-k most related facts about the entity mention), or other machine learning or programmatic approach. In some illustrative embodiments, 1-hop relations for entity/category mentions may be utilized. Of course other rules for identifying and evaluating structural elements of an electronic document that are either local or non-local, and contiguous or non-contiguous, with the document element being analyzed may be utilized without departing from the spirit and scope of the illustrative embodiments.

The embedding logic 144 trains a neural network 145 based on the dependency structure of an electronic document produced by the dependency annotation logic 142. The goal is to provide a neural network 145 that converts each document element (e.g., word, sentence, portion of text, figure, table, etc.), represented as a node in the dependency data structure, as a vector representation based on an input of the edges generated by the dependency annotation logic 142. Each document element is first represented as one or more numerical values. Examples of such primitive numeric representations include a sequence of one-hot vectors for a sentence, three matrices representing RGB values of an image, one-hot vector for entities, relations of an external knowledge graph, or the like. To illustrate the case of a sentence, a vocabulary of words may first be built in the corpus. In the dependency data structure 143, a list of edges among sentences may be generated with their dependencies as edge labels for each document in the corpus 106. The deep embedding engine 140 may map words in each sentence into a dimension to represent them as a one-hot vector for that sentence in which there is only a single "1" for the dimension representing that word, and all other dimensions are "0". Then, the embedding logic 144 may ingest the vector representation of each sentence and its incident edges to train the neural network 145. The neural network 145 applies diverse encoding/decoding operations on the input vector representations. Examples of such encoding/decoding operations may include, for example, long short term memory operations, as described in Hochreiter et al., "Long Short-Term Memory," Neural Computation. 9 (8): 1735-1780, 1997, and/or gated recurrent unit operations, such as described in Chung et al., "Empirical Evaluation of Gated Recurrent Neural Networks on Sequence Modeling," arXiv: 1412.3555, 2014. Each output of the decoders is transformed by a dependency-specific function, such as constant multiplication for example, to amplify the output of influential dependency. Then the transformed outputs of the decoders are aggregated and processed by the decoder. The decoder can be similarly implement as long short-term memory operation, gated recurrent unit operation, or the like.

The neural network 145 is trained with an unlabeled corpus using the dependencies specified in the dependency data structure 143. The training method can be either skip-gram-like, such as described in Mikolov et al., "Distributed Representations of Words and Phrases and their Compositionality," Advances in Neural Information Processing Systems, 2013, Continuous Bag of Words (CBOW)-like, such as described in Mikolov et al., "Efficient Estimation of Word Representations in Vector Space," arXiv preprint arXiv: 1301.3781 (2013), or the like. CBOW predicts a target word given its surrounding words as its dependencies. Since the input is the surrounding words the target word depends on, and the prediction goal is the target word and no human-labeled classes or values are required. In accordance with the illustrative embodiments, given a target sentence to predict, the representations of its contexts that are generated by encoders are aggregated and consumed by the decoder to predict a target sentence. While the encoder of CBOW considers only neighboring words in a small local window and uses a direct mapping from word to word embedding, the illustrative embodiments leverage diverse types of dependencies and apply a recurrent neural network.

That is, firstly, for each sentence y (or document element), there is a set of edges $\{(x_1, label_1, y), \ldots, (x_n, label_n, y)\}$, where $x_1$ is a governing sentence (or document element) and label$_i$ is a dependency label for the i-th dependency edge, forming dependency data structure 143 from dependency annotation logic 142, e.g., ($x_i$, title-sentence, y) meaning that sentence $x_i$ is the title for the sentence y. Suppose X is a set of dependent sentences $\{x_1, \ldots, x_n\}$ that are dependent on sentence y. The numerical representations, e.g., vectors generated by the embedding logic 144, of the governing sentences X (or document elements) are optimized to predict the incoming edges to y (document elements X generating this document element y), or in some embodiments the outgoing edges, including both edge label (e.g., direct object, title-sentence, etc.), and representation (e.g., vector) of the edges. For example, for a sentence x, the sentence has outgoing edges of the type (x, label, y) where x is the governing sentence and y is the dependent sentence, and has incoming edges of the type (y, label x) where y is the governing sentence, and x becomes the dependent sentence.

As one example, the neural network 145 may be trained by the embedding logic 144 using the numerical representations of the dependency data structure 143 by optimizing the title, i.e. the vector representation of the title generated by the neural network 145, i.e. optimizing the settings of the values in the vector slots of the vector representation, to predict each sentence in the document. In accordance with one illustrative embodiment, what is actually predicted is a sequence of vectors (with the number of words as the sequence length), and each vector is a one-hot vector. For example, the goal may be to predict [0, 1, 0, 0], [1, 0, 0, 0], and [0, 1, 0, 0] (which may represent "one on one" or the like). The neural network 145 output may be [0.2, 0.6, 0.1, 0.1], [0.5, 0.1, 0.2, 0.2], and [0.1, 0.8, 0.1, 0]. These numerical values represent probabilities, which gives possibilities of diverse combinations. The output sequence of vectors may be expanded into actual word sequences with scores like "one on one: 0.6*0.5*0.8", "one vs. one: 0.6*0.2*0.8", "one vs. all: 0.6*0.2*0.1" if the dimensions represent [on, one, all, vs]. Note that the goal is not to generate (exact) sentences, but to learn their vector representations (sentence embedding).

In other examples, the representation of a figure described by a sentence may be optimized to predict the sentence. The representation of a figure can be derived from an autoencoder (e.g., using ConvNet and DeConvNet) or word/sentence embedding on image recognition/caption generation techniques. The representation of a table may be derived from a set of triples indicating each cell (i.e., (row, column, value)) using knowledge base embedding approaches. The representation of basic document elements, such as words, may be fixed (e.g., one-hot encoding) to prevent overfitting the model.

The application interface logic 146 is defined based on the particular natural language processing functionality being implemented for the cognitive system. For example, a vector cosine similarity and threshold methodology may be implemented in the application interface logic 146 to solve sentence similarity problems, such as paraphrase detection, in natural language processing, or to identify sentences that are directed to similar concepts or represent similar relationships. That is, the vector representations generated by the embedding logic 144 should be similar for similar sentences representing similar concepts or similar relationships. As such, a comparison of the vector representations of two sentences may indicate whether or not the sentences represent a similar concept or relationship.

For example, the application interface logic 146 may be applied to the following two sentences to determine if they are referring to a similar relationship:
(1) Today, Locky is distributed by fake credit card declined alert with the subject line of "Transaction declined."
(2) MX Lab started to intercept a new malware distribution campaign by email with the subject "Transaction declined."

By representing each sentence as a vector representation using the embedding logic 144 in the manner discussed above, more accurate vector representations are generated. Thereafter, with the application interface logic 146, a more accurate natural language processing functionality is made possible, such as a similarity comparison, since the underlying vector representations are more accurate. Such similarity analysis based on vector representations may determine whether the sentences mention the same entity or same type of entity, e.g., malware in the above example sentences. Such similarity analysis may further determine if the sentences indicate a same property, such as an indicator of compromise (IoC) in the above examples, e.g., alert with subject line in sentence (1) and email with the subject in sentence (2). For example, in the above two sentences, it may be determined that these sentences are referring to a similar relationship of a malware being associated with a communication having the subject "transaction declined."

Also, since the trained neural network 145 can be used to generate a sentence given its dependencies, the application interface logic 146 can use this generation to identify missing document elements or coreference mentions (e.g., it, the program, etc.) in a sentence. For example, the illustrative embodiments may fill a missing document element in a target sentence by feeding those elements, on which the target sentence depends, to the encoders of the neural network 145, and only the known part of the target sentence into the decoder of the neural network 145. In particular, each cell of a recurrent neural network 145 that can be used to implement the decoder, takes the output of the previous cell to consider it. Instead of using the output of the previous cell, in accordance with one illustrative embodiment, the deep embedding engine 140 may provide the known part of the target sentence, if available. One or more additional neural networks (not shown) may be provided to further improve the performance of particular applications by using more application specific features in the embedding with corresponding application specific training data. That is, in addition to, or alternative to, the more general, non-labeled corpus based training of the neural network 145 performed by the above described deep embedding engine 140, for specific applications, application specific training of a neural network may be employed. For example, some tasks, such as sentiment analysis or the like, may be performed using a sentiment labeled corpus. The mechanisms of the illustrative embodiments may be employed to perform embedding using the sentiment labeled corpus and other logic of the ingestion engine 130, via the application interface logic 146, may ingest the embedding and generate a sentiment score, for example. Other applications may utilize other labeled corpora and perform other application specific scoring or operations on the resulting embedded natural language content generated by the deep embedding engine 140.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identities a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, an ingestion engine 305 is provided that ingests the corpus/corpora 345, 347 and performs embedding on the natural language content, figures, images, tables, and other elements of the electronic documents of the corpus/corpora 345, 347. The ingestion engine 305 includes logic implemented in specialized hardware, software executed on hardware, or any combination of specialized hardware and software executed on hardware, for implementing a deep embedding engine 390 that performs embedding operations of one or more of the illustrative embodiments described herein to embed document elements, e.g., words, phrases, sentences, or other portions of textual content, and/or non-textual data objects, such as figures, tables, and the like, where the embedding operation results in a vector representation of the corresponding natural language text data object or non-textual data object of the electronic document. The deep embedding engine 390 includes dependency annotation logic 392, embedding logic 394, and application interface logic 396 (these elements are similar to elements 140-146 in FIG. 1).

As mentioned above, the dependency annotation logic 392 creates, for an electronic document being ingested, labeled directed edges in a dependency data structure, such as a directed acyclic graph, over document elements in a document. Nodes of the dependency data structure represent these document elements and edges represent dependencies that are determined, at least in part, using non-contiguous long distanced semantic dependency determinations based on the structure of the document as well as external knowledge source dependencies. It should be appreciated that local contexts may also be represented in the dependency data structure. Dependencies between document elements and/or external knowledge sources may be defined by rule-based mechanisms, a machine learning approach, or the like.

As such, in accordance with one illustrative embodiment, a rules database 393 may be provided that comprises the rules for identifying patterns within natural language text that identifies dependencies between long distanced non-continuous document elements and generates edges in a dependency data structure 395 for representing the dependencies within the electronic document and dependencies between the electronic document and other electronic documents and/or external knowledge sources, e.g., a knowledge base. Local dependencies may be identified using known methodologies implemented in the dependency annotation logic 392 and may also be represented within the dependency data structure 395. It should be appreciated that each ingested electronic document may have its own associated dependency data structure 395 generated for the electronic document which may then be used to perform embedding on the document elements of the electronic document to generate an embedded electronic document.

The rules in the rules database 393 identify extra-sentence dependencies that can be utilized for embedding, such as sentence embedding. These rules may identify dependencies based on titles, lists, document references, knowledge base information, and other non-contiguous long distanced dependencies based on structure and/or external knowledge sources. The intra-document non-contiguous long distanced dependencies may include titles, lists, and intra-document references, such as footnotes, non-non-contrastive conjunctions/conjunctive adverbs, parallel structures, image/table references, and the like, present in the natural language content of the ingested document. Extra-document dependencies may include hyperlinks or citations to other documents and entity references for which other background information is available from an external knowledge source.

With regard to titles within a document, the title of a document contains the gist of the document, and all other sentences describe or support the title. Section titles are similar but with a reduced span of sentences. The rules of the rules database 393, as applied to the natural language content of an ingested electronic document by the dependency annotation logic 392, identifies a document title and section or chapter titles in a document and then recognizes the region in the document with which each title is associated, or which the title governs. The title is then utilized as part of the embedding process for all sentences in the region that the title is associated with or governs.

The titles are extracted, in some illustrative embodiments, using metadata information, such as in the case of Microsoft Word™ word processor generated documents, PDF documents, and the like. The titles may also be extracted using title and head tags, such as in the case of Hyper Text Markup Language (HTML) and other markup language documents. The titles may further be extracted using a table of contents, header and footer information, and styles such as all uppercase and bigger font size styles. The structure of the document, page numbers in a table of contents, slicing up of the document based on section titles, and the like, may be used to identify the regions to which a title corresponds and which the title governs.

With regard to lists, a list is an enumeration of items supporting a certain topic, which usually appears right before the first list item. Especially, if a list contains many items or many sentences in each item, the distance between the list description and the list item becomes long. Existing approaches using local context cannot capture these relationships or dependencies as they only look at the immediate preceding or subsequent list item.

As noted above, rules may be established based on identifiable patterns for identify numbered lists, bullet lists, or any in-text list. Number and bullet lists can be identified by either their number sequences and bullets, their markup or metadata tags (e.g., <UL/>, <OL/>, <L1/>, etc.). Then, the sentence before the list items is considered to govern the list items. In addition, in-text lists such as "First, . . . , Second, . . . , Last . . . " may be identified by identifying the defined pattern, trigger words, and the like. Similar to other list structures, the preceding sentence is considered to govern the list items in such in-text lists.

With regard to references within the electronic document, the dependency annotation logic 392 may identify various relationships with diverse document elements including figures, tables, images, pictures, and other documents through hyperlinks and citations. There are multiple ways of leveraging these references including using high-level summaries, such as figure and table captions, and cited/linked document titles. Other ways of leveraging these references may include using the embedding of figures, tables and documents to generate edges in a dependency data structure 395 of the electronic document.

With regard to external knowledge base information, the dependency annotation logic 392 emulates human thought when a human being is reading a document and bringing to the understanding of the document, the human being's own external knowledge of the concepts referenced in the document (e.g., recent events, general definition, relations to other entities, etc.). Thus, for example, when an entity is mentioned in an electronic document, the dependency annotation logic 392 may search an external knowledge base 399 for entries in the external knowledge base 399 that correspond to the entities mentioned in the electronic document. If entries are found in the external knowledge base 399 that correspond to the entities in the electronic document, then a corresponding edge may be generated in the dependency data structure 395 by applying a knowledge graph embedding approach and using an additional translation matrix to transform it into a sentence embedding space.

Other rules for the identification of structural and external knowledge source non-contiguous long distanced dependencies and corresponding logic for generating edges corresponding to these dependencies may also be provided in the rules database 393. The resulting edges may be used as context information for performance of embedding of the nodes in the dependency data structure 395.

Figure 4:
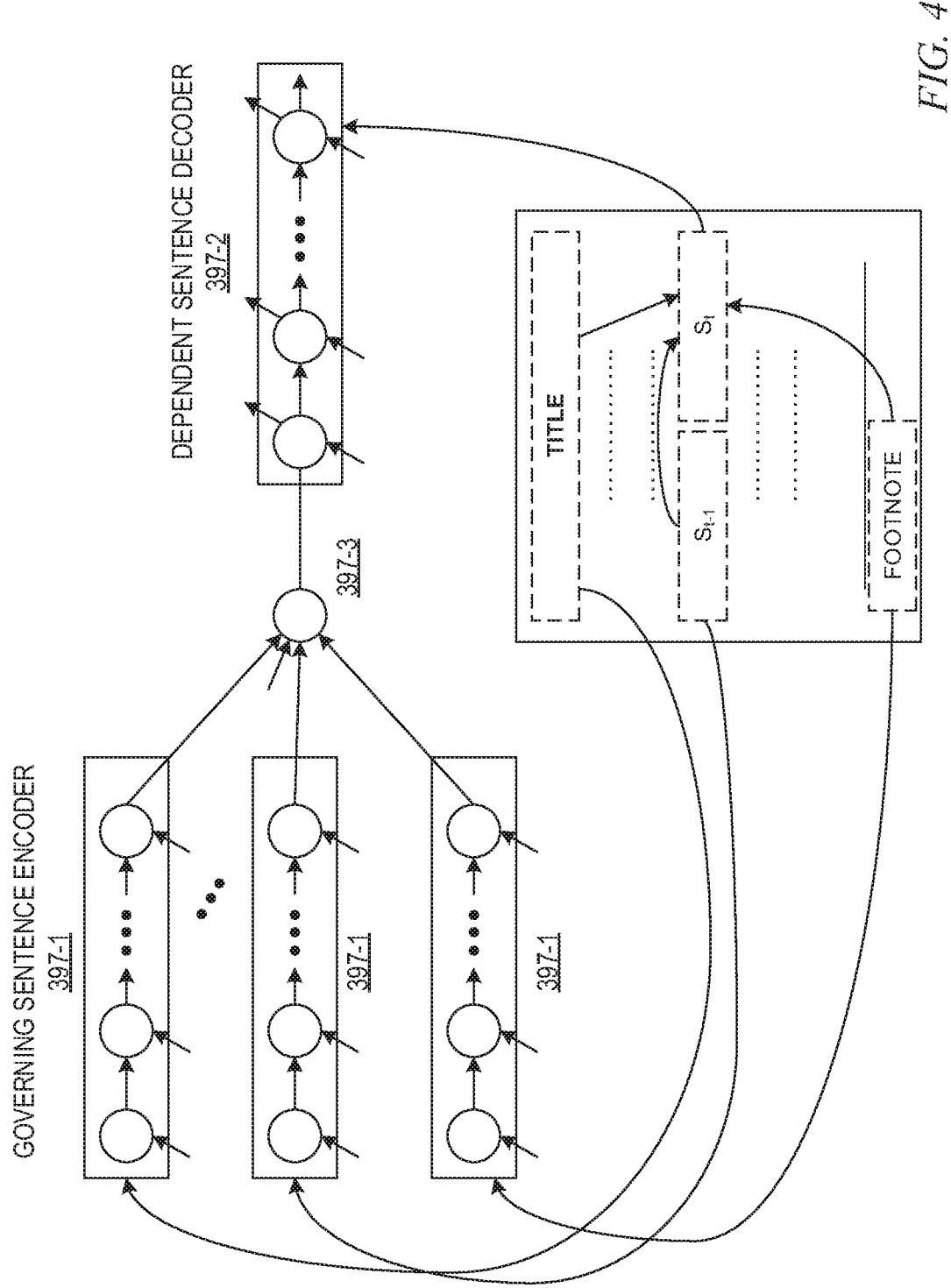
FIG. 4 is an example diagram of an embedding engine in accordance with one illustrative embodiment.

The embedding logic 394 trains a neural network 397 based on the dependency data structure of an electronic document produced by the dependency annotation logic 142. As shown in FIG. 4, the neural network 397 includes several encoders 397-1 for encoding different types of governing document elements, e.g., local context information, extra-sentence context information, such as titles, lists, references, and the like, an aggregation node 397-3, and a decoder 397-2 that decodes the aggregated encoded vectors from the encoders 397-1 to generate a vector embedding for a target document element, e.g., a sentence. Using sentence embedding as an example, the encoders 397-1 embed all the knowledge required to predict a target sentence. For example, knowing the title "Types of Malware" of a document gives the neural network 397 a better clue that the context within the document may switch from "Trojan horses" (a first type of malware) to "Ransomware" (a second type of malware). The encoders 397-1 for the same type of document element share the variables to reduce the number of parameters, but the outputs are weighted according to the dependency types before aggregation at the decoder 397-2. For a textual element, an example implementation of the neural network 397 may have cells that ingest a sequence of words, represented as numbers or one-hot vectors, where each cell receives as input one word, and each encoder/decoder has many cells that can ingest longer units of text, such as a sentence or the like. The encoder or decoder translates the ingested numbers or one-hot vectors into dense vectors representing the semantics of the corresponding words. For such a vector, pre-trained vectors from a continuous bag of words (CBOW) model may be used to reduce the training time, and these vectors can be optionally updated during model training. For images, the illustrative embodiments may adopt existing image embedding approaches, such as convolutional neural networks, and provide RGB pixels. For tables and knowledge base facts, the illustrative embodiments may adopt existing knowledge base embedding techniques that operate on a triple such as (row, column, value) or (entity 1, relation, entity 2).

More formally, as one example of an encoder/decoder for a sentence (keeping in mind that other structures may be utilized in other illustrative embodiments), given an input sequence $X_i = (x_{i,1}, \ldots ; x_{i,|Xi|})$ of words input (comprising a sentence, for example, or other portion of text) to an encoder 397-1 for i-th dependency, $w(x_{i,t})$ denotes a word representation (pre-trained or randomly initialized) of word $x_{i,t}$. Then, the following equations define the encoder for textual dependencies including titles, neighboring sentences, and the like for the t-th word.

$$h_{i,t} = RNNCell_{dep(i)}(w(x_{i,t}), h_{i,t-1}) \quad (1)$$

$$hi = h_{i,|Xi|} \quad (2)$$

$$\bar{h}_0 = \sum_i W_{dep(i)} h_i + b \quad (3)$$

where $RNNCell_{dep(i)}$ is a recurrent neural network cell (e.g., LSTM or GRU) for dependency type dep(i) of the i-th dependency that maintains and updates the memory $h_{i,t}$; $W_{dep(i)}$ is the transformation/scaling matrix for dependency type dep(i) of the i-th dependency; and b is a vector that constitute the transformation/scaling function together with $W_{dep(i)}$. Other than the recurrent neural network, the mechanisms of at least one of the illustrative embodiments may utilize convolutional neural network to obtain $h_i$ if the dependency is an image, and knowledge base embedding using convolutional neural network and composition for triples, such as a table entry, or knowledge graph relationships. Note that in these illustrative embodiments, the mechanisms allow $h_i$'s to have different dimensions and $W_{dep(i)}$ can be used to match the dimensions.

Now, the decoder 397-2 in these illustrative embodiments may be defined as follows to predict the t-th word:

$$o_t, \bar{h}_t = \text{RNNCell}(o_{t-1}, \bar{h}_{t-1}) \quad (4)$$

$$y_t = \sigma(Vo_t + c) \quad (5)$$

where RNNCell is a recurrent neural network cell (e.g., LSTM or GRU) that maintains and updates the memory $h_t$ and generates the output $o_t$ using the previous output $o_{t-1}$ and the previous memory $h_{t-1}$ or the aggregation bar {h0} of the decoder outputs, $\sigma(.)$ is the softmax function (see Wikipedia article for softmax function), and $(V\,o_t+c)$ is the transformation into the vocabulary space where V is a matrix and c is a vector. That is, $y_t$ represents logits for words in the vocabulary set, and can be used to predict the words in the target sentence. In training, random K sentences on which a target sentence depends are chosen, and the cross entropy is used on $y_t$ as the loss function. During the training phase, the following parameters are trained: parameters in $\text{RNNCell}_{dep(i)}(.)$, $W_{dep(i)}$, b, V, c, RNNCell(.), and optionally w(.).

As noted above, the training method can be either skip-gram-like or CBOW-like. The illustration and the formulation shows the CBOW-like structure. For example, for each sentence (or document element), the representation (e.g., a vector generated by the embedding logic 394) of the sentence (or document element) is optimized to predict the outgoing edges (document elements depends on this document element) including both edge label (e.g., dobj, title-sentence, etc.) and representation (e.g., vector), or the outgoing edges can be used as input to predict the given sentence document element). For example, the neural network representation of the title, i.e. the vector representation of the title generated by the neural network, is optimized, i.e. the settings of the values in the vector slots of the vector representation, to predict each sentence in the document. The representation of a figure described by a sentence is optimized to predict the sentence. The representation of a figure can be derived from an autoencoder (e.g., using ConvNet and DeConvNet) or word/sentence embedding on image recognition/caption generation techniques. The representation of a table may be derived from a set of triples indicating each cell (i.e., (row, column, value)) using knowledge base embedding approaches. The representation of basic document elements, such as words, may be fixed (e.g., one-hot encoding) to prevent overfitting the model.

The output of the embedding logic 394 is an embedded document element, or document comprising a plurality of embedded document elements, e.g., sentences. The output of the embedding logic 394 is provided to the application interface logic 396 which performs natural language processing operations on the embedded output based on the particular natural language processing functionality being implemented for the cognitive system. For example, a simple vector cosine similarity and threshold methodology may be implemented in the application interface logic 396 to solve sentence similarity problems such as paraphrase detection. Also, since the trained neural network can be used to generate a sentence given its dependencies, the application interface logic 396 can use this generation to identify missing document elements or coreference mentions (e.g., it, the program, etc.) in a sentence.

With regard to training, unlike some approaches that use application specific labels, the illustrative embodiments learn application independent sentence representations. The illustrative embodiments predict a target sentence given the context and are trained using an unlabeled corpus, i.e. a corpus that has not been annotated by human beings for training purposes. Moreover, existing approaches do not provide all necessary information to predict the next sentence, and no machine learning algorithms can produce correct output without correct input. Thus, existing approaches tend to have the overfitting problem. In contrast, the illustrative embodiments identify and feed necessary dependencies including images, tables, and external sources to prevent such an overfitting problem. In addition, existing approaches only consider contiguous or intra-sentence dependencies which may not capture global context. However, the illustrative embodiments provide a more robust to sudden context change (e.g., from trojan to ransomware in the global context of "types of malware").

Figure 5:
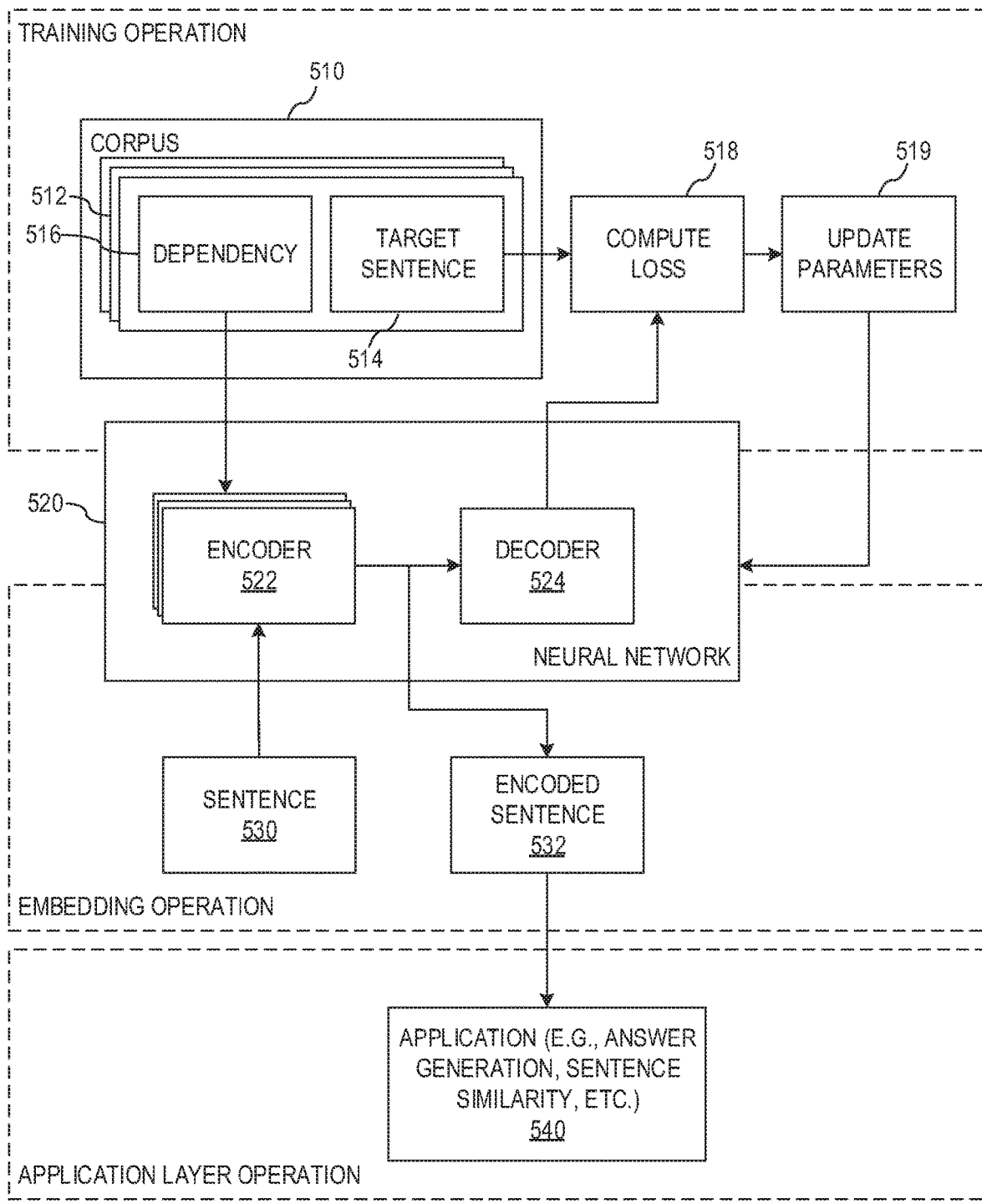
FIG. 5 is an example diagram illustrating the interaction of training, embedding, and application layer operations in accordance with one illustrative embodiment.

FIG. 5 is an example diagram illustrating the interaction of training, embedding, and application layer operations in accordance with one illustrative embodiment. FIG. 5 illustrates the various layers of functionality performed, for example, as noted above with regard to FIG. 1, by the dependency annotation logic 142, the embedding logic 144 in conjunction with the neural network 145, and the application interface logic 146.

As shown in FIG. 5, during a training operation of the embedding neural network, e.g., neural network 145 in FIG. 1 or neural network 397 in FIG. 3, an annotated corpus 510 of documents 512, having target sentences 514 and corresponding dependency annotations 516, is provided where the dependencies may be represented as dependency data structures of the type previously discussed above. For example, in some illustrative embodiments, the dependencies may be represented as edges in a dependency data structure connecting nodes, where the nodes represent the document data objects (natural language text data objects or non-natural language text data objects), structural document elements, e.g., titles, section titles, captions, links, etc., and the like, that have a relationship represented by the edge. Thus, a dependency may be represented by a tuple in which the two nodes, and the corresponding relationship between those nodes, are specified. For example, each dependency for a document data object y may be represented in a tuple format as (x, dependency relationship, y), where x is the other document data object or structural document element from which y depends, i.e. y-depends on-x.

The dependencies, as may be represented by the edges and corresponding tuples, may be aggregated for each document element. That is, all of the tuples corresponding to edges that reference the document element y may be aggregated, thereby building {(x, d, y)|d is a possible dependency label, x is a document data object (sentence/image/title, etc.)} given a document data object y. For example, an aggregation of two edges may be of the type {("Types of Malware", document-title, "Ransomware is . . . "), (wikipedia.org/wiki/Ransomware, url, "Ransomware is . . . ")}.

In some illustrative embodiments, the target sentences and aggregated dependencies may be processed using an integralization or on-hot encoding operation by the dependency annotation logic 142, 392. The integralization operation may comprise using a vocabulary obtained from a collection of all of the words in the corpus 510, and representing each word numerically through the building of a one-to-one mapping between numbers and words. For example, if the vocabulary is {cat, dog, child}, then numerical values may be assigned to these words as follows {0, 1, 2}. It is only necessary to assign distinct numbers, so the numerical values could also be {99, 30, 54} or any other numerical representation, depending on the particular implementation. The one-hot encoding turns this numerical representation into a vector where only the dimension specified by the number is 1, and all the other dimensions are 0. For example, using the previous example, the word "cat" will be [1, 0, 0], the word "dog" will be [0, 1, 0], and the word "child" will be [0, 0, 1]. With the illustrative embodiments, the integralized representation may be directly used by the encoders 522 of the neural network 520, or the one-hot representation may be utilized, depending on the desired implementation of the illustrative embodiment.

The one-hot encoding or integralized representation of the target sentence, as well as the dependencies, are fed to the encoders 522 which may translate the one-hot encoding or integralized representations of the input words to dense vectors (e.g., pre-trained vectors), and use them to encode/embed the sentence in accordance with one of the previously described embodiments, such as described above with regard to FIGS. 3 and 4. As previously noted above, each encoder 522 may be configured to encode/embed the document data object, e.g., target sentence, with regard to specific non-local non-contiguous elements of the document, e.g., titles, section titles, links to external documents, captions or references to tables, images, etc., and the like. The decoder 524 aggregates the encoder 522 results to compute an error compared to the actual target sentence, i.e. compute the loss 518. Based on the computed loss, parameters for the operation of the neural network 520 may be modified so as to reduce the loss. Once the loss is below a threshold value, the parameter change is negligible, or the number of training iterations is above a threshold, the neural network 520 is considered to have been trained. It should be appreciated that the particular loss computation and the parameters modified based on the loss may be implementation specific. For example, cross entropy loss function, RMSE loss function, or the like may be utilized to compute the loss. The updated parameters may comprise weights assigned to nodes in the neural network as well as other parameters as discussed previously.

The actual updating of the neural network may utilize any of a diverse set of procedures including, but not limited to, stochastic gradient descent, AdaGrad, Adam, and the like. These procedures compute the gradient of the loss function with respect to each parameter to find the amount of a parameter update needed to achieve a lower loss, possibly in the fastest way. This process is repeated to find the desirable parameter value with a fast a convergence as possible.

Once trained, the encoders 522 of the trained neural network 520 may be provided with a sentence, or other document data object, input 530 for embedding. The encoders 522 perform encoding to generate the embedded sentenced 532. The embedded sentence 532 is then provided to an application layer application 540 which performs a natural language processing operation based on the embedded sentence 532. As discussed previously, this natural language processing operation may take many different forms depending on the particular implementation and may include various types of natural language processing including, but not limited to, question answer, coreference resolution, paraphrase detection, word sense disambiguation, entity and event resolution, opinion mining, semantic relatedness, image-sentence ranking, image generation from text, story generation, subjectivity/objectivity classification, and/or question-type classification.

Figure 6:
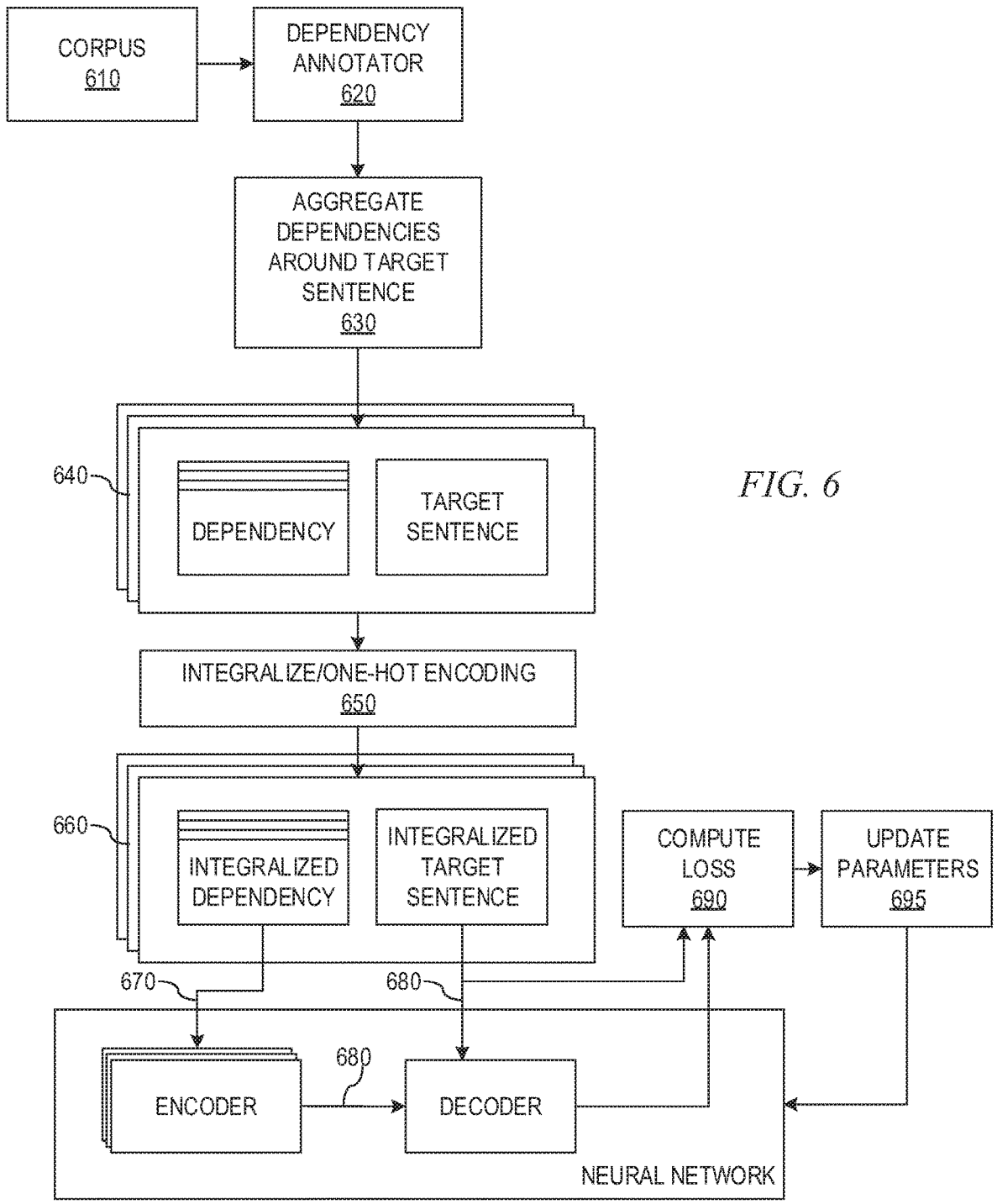
FIG. 6 is a flowchart outlining a training operation for training an embedding neural network in accordance with one illustrative embodiment.

FIG. 6 is a flowchart outlining a training operation for training an embedding neural network in accordance with one illustrative embodiment. As shown in FIG. 6, the operation starts by receiving a corpus (step 610) and processing the corpus with a dependency annotator that annotates document data objects with non-local non-contiguous context dependencies (step 620). It should be appreciated that while the annotator annotates the document data object with non-local non-contiguous context dependencies, which may include dependencies to various structural document elements such as titles, section titles, links, etc., the dependency annotator may also annotate the document data objects with regard to local contexts as well.

The dependences are aggregated around document data objects, which for purposes of this description will be considered to be target sentences in the document (step 630) to form data structures representing the target sentences and their corresponding dependencies (step 640). These data structures may be processed by integralization operations, on-hot encoding operations, or the like (step 650) to generate integralized data structures representing integralized target sentences and their corresponding integralized dependencies (step 660).

The integralized data structures are fed to the encoders of the neural network which perform encoding/embedding operations on the integralized dependency information while the integralized target sentence is fed to the decoder of the neural network (step 670). The encoders encoding the integralized dependency information and output the results to the decoder which operates on the integralized target sentence and the results generated by the encoders to aggregate the results of the encoders and compare the result to the integralized target sentence (step 680). The loss is computed (step 690) based on a comparison of the results of the decoder with the integralized target sentence, and corresponding parameter updates are determined (step 695) and fed back into the neural network to modify the operation of the neural network. This process may be repeated until the computed loss is equal to or below a predetermined threshold, or until other convergence criteria are met. Moreover, this training may be performed with a plurality of target sentences in an iterative fashion so as to achieve a convergence of the computed loss and ultimately training of the neural network to predict the target sentence given the embedded representation generated by the encoders.

Figure 7:
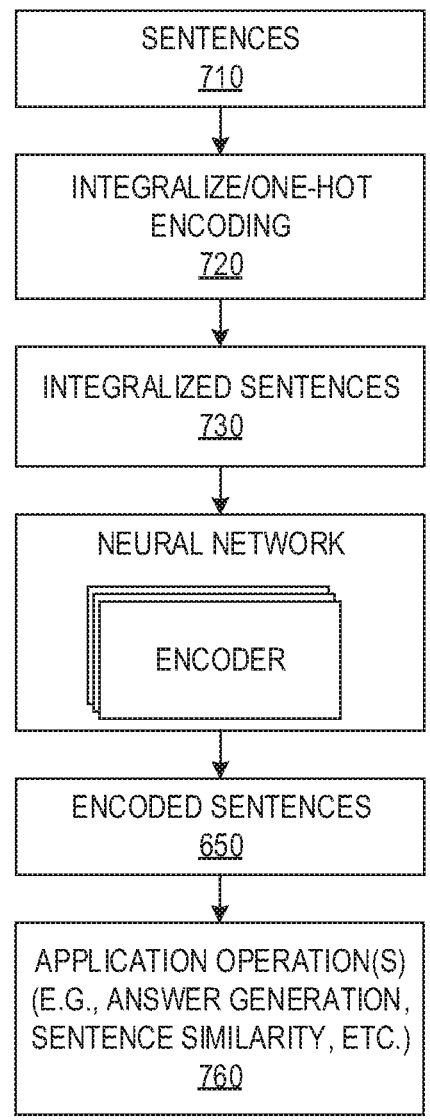
FIG. 7 is a flowchart outlining an example operation of an embedding operation using a trained neural network in accordance with one illustrative embodiment.

FIG. 7 is a flowchart outlining an example operation of an embedding operation using a trained neural network in accordance with one illustrative embodiment. As shown in FIG. 7, the operation starts by receiving a document data object, e.g., a sentence, to be embedded (step 710). The document data object is processed by an integralization operation, one-hot encoding operation, or the like, (step 720) to generate an integralized document data object (step 730). The integralized document data object is input to the encoders of the neural network (step 740), which processes the integralized document data object to generate an embedded document data object, e.g., an embedded sentence (step 750). The embedded document data object is then output to a natural language processing engine for performance of a natural language processing operation based on the embedded document data object (step 760).

Thus, the illustrative embodiments provide mechanisms for improved embedding of natural language content that takes into consideration non-contiguous, long distanced, semantic dependencies and external knowledge sources when performing the embedding operations. The illustrative embodiments eliminate the limitations of known mechanisms which are limited to local contexts of an immediately previous or following sentence when performing sentence embedding. The illustrative embodiments leverage the structural relationships between portions of a document to provide additional insights into more accurate values for vector slots of a vector representation of a sentence or other document element.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable fir storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to configure the processor to implement a natural language embedding engine, the method comprising:
   receiving, by the natural language embedding engine executing on the processor, a document data object of an electronic document;
   analyzing, by the natural language embedding engine, a structure of the electronic document to identify one or more structural document elements that have a relationship with the document data object, wherein analyzing the structure of the electronic document comprises applying a set of rules from a rules database representing dependencies within the electronic document and dependencies between the electronic document and an external knowledge source;
   generating, by the natural language embedding engine, a dependency data structure representing the electronic document, wherein edges in the dependency data structure define relationships between document elements, and wherein at least one edge is generated in the dependency data structure to represent at least one relationship between the one or more structural document elements and the document data object;
   executing, by the natural language embedding engine, an embedding operation on the document data object based on the at least one relationship in the dependency data structure to thereby represent the document data object as a vector data structure; and
   performing, by a natural language processing engine executing in the data processing system, a natural language processing operation on the document data object based on the vector data structure, wherein the one or more structural document elements comprise one or more structural document elements that are non-local non-contiguous with the document data object.

2. The method of claim 1, wherein the document data object is a non-natural language text data object representing an image, table, or other portion of non-textual content in the electronic document.

3. The method of claim 1, wherein the document data object comprises a natural language sentence of the electronic document, and wherein the one or more structural document elements comprise at least one of a title of the electronic document or a section title of a section within the electronic document.

4. The method of claim 1, wherein the document data object comprises an image or table in content of the electronic document, and wherein the at least one structural document element comprises a reference to the image or table.

5. The method of claim 1, wherein the one or more structural document elements comprise at least one of:

a link to another electronic document, wherein the at least one edge representing at least one relationship between the one or more structural document elements and the document data object comprises an edge representing a relationship between content of the other electronic document, and the document data object, or an association of the document data object with data in an external knowledge base, wherein the at least one edge representing at least one relationship between the one or more structural document elements and the document data object comprises an edge representing a relationship between content of the external knowledge base, and the document data object.

6. The method of claim 1, wherein generating the dependency data structure comprises:

generating edges as a dependency tuple having a first tuple element identifying a dependent document element, a second tuple element representing a dependency relationship, and a third tuple element representing a document element which depends on the first tuple element; and aggregating, for each document element in the electronic document, dependency tuples referencing the document element.

7. The method of claim 1, wherein executing an embedding operation on the document data object based on the at least one relationship in the dependency data structure to thereby represent the document data object as a vector data structure comprises:

inputting the document data object into a trained neural network comprising a plurality of embedding encoders and at least one embedding decoder;

processing, by the plurality of embedding encoders, the document data object to generate an embedded document data object comprising the vector data structure, wherein each embedding encoder performs an encoding operation on the document data object with respect to a different type of structural document element; and outputting, by the neural network, the embedded document data object to the natural language processing engine.

8. The method of claim 1, wherein the natural language processing operation comprises at least one of coreference resolution, paraphrase detection, word sense disambiguation, entity and event resolution, opinion mining, semantic relatedness, image-sentence ranking, image generation from text, story generation, subjectivity/objectivity classification, or question-type classification.

9. The method of claim 1, wherein the set of rules identify extra-sentence dependencies.

10. The method of claim 1, wherein the set of rules identify extra-document dependencies.

11. The method of claim 10, wherein the extra-document dependencies include hyperlinks, citations to other documents, and entity references for which other background information is available from an external knowledge source.

12. The method of claim 1, wherein the set of rules identify intra-document non-contiguous long distanced dependencies.

13. The method of claim 12, wherein the intra-document non-contiguous long-distanced dependencies include titles, lists, intra-document references, non-non-contrastive conjunctions/conjunctive adverbs, parallel structures, and image/table references.

14. A computer program product comprising a computer readable storage medium having a computer readable program stored therein, wherein the computer readable program, when executed in a data processing system, causes the data processing system to:

receive, by a natural language embedding engine executing in the data processing system, a document data object of an electronic document;

analyze, by the natural language embedding engine, a structure of the electronic document to identify one or more structural document elements that have a relationship with the document data object, wherein analyzing the structure of the electronic document comprises applying a set of rules from a rules database representing dependencies within the electronic document and dependencies between the electronic document and an external knowledge source;

generate, by the natural language embedding engine, a dependency data structure representing the electronic document, wherein edges in the dependency data structure define relationships between document elements, and wherein at least one edge is generated in the dependency data structure to represent at least one relationship between the one or more structural document elements and the document data object;

execute, by the natural language embedding engine, an embedding operation on the document data object based on the at least one relationship in the dependency data structure to thereby represent the document data object as a vector data structure; and perform, by a natural language processing engine executing in the data processing system, a natural language processing operation on the document data object based on the vector data structure, wherein the one or more structural document elements comprise one or more structural document elements that are non-local non-contiguous with the document data object.

15. The computer program product of claim 14, wherein the one or more structural document elements comprise at least one of:

a link to another electronic document, wherein the at least one edge representing at least one relationship between the one or more structural document elements and the document data object comprises an edge representing a relationship between content of the other electronic document, and the document data object, or an association of the document data object with data in an external knowledge base, wherein the at least one edge representing at least one relationship between the one or more structural document elements and the document data object comprises an edge representing a relationship between content of the external knowledge base, and the document data object.

16. The computer program product of claim 14, wherein generating the dependency data structure comprises:

generating edges as a dependency tuple having a first tuple element identifying a dependent document element, a second tuple element representing a dependency relationship, and a third tuple element representing a document element which depends on the first tuple element; and aggregating, for each document element in the electronic document, dependency tuples referencing the document element.

17. The computer program product of claim 14, wherein executing an embedding operation on the document data object based on the at least one relationship in the dependency data structure to thereby represent the document data object as a vector data structure comprises:

inputting the document data object into a trained neural network comprising a plurality of embedding encoders and at least one embedding decoder;

processing, by the plurality of embedding encoders, the document data object to generate an embedded document data object comprising the vector data structure, wherein each embedding encoder performs an encoding operation on the document data object with respect to a different type of structural document element; and outputting, by the neural network, the embedded document data object to the natural language processing engine.

18. The computer program product of claim 14, wherein the natural language processing operation comprises at least one of coreference resolution, paraphrase detection, word sense disambiguation, entity and event resolution, opinion mining, semantic relatedness, image-sentence ranking, image generation from text, story generation, subjectivity/objectivity classification, or question-type classification.

19. An apparatus comprising:

at least one processor; and at least one memory coupled to the at least one processor, wherein the at least one memory comprises instructions which, when executed by one or more processors of the at least one processor, causes the one or more processors to:

receive, by a natural language embedding engine executing on the one or more processors, a document data object of an electronic document;

analyze, by the natural language embedding engine, a structure of the electronic document to identify one or more structural document elements that have a relationship with the document data object, wherein analyzing the structure of the electronic document comprises applying a set of rules from a rules database representing dependencies within the electronic document and dependencies between the electronic document and an external knowledge source;

generate, by the natural language embedding engine, a dependency data structure representing the electronic document, wherein edges in the dependency data structure define relationships between document elements, and wherein at least one edge is generated in the dependency data structure to represent at least one relationship between the one or more structural document elements and the document data object;

execute, by the natural language embedding engine, an embedding operation on the document data object based on the at least one relationship in the dependency data structure to thereby represent the document data object as a vector data structure; and perform, by a natural language processing engine executing on one or more of the processors, a natural language processing operation on the document data object based on the vector data structure, wherein the one or more structural document elements comprise one or more structural document elements that are non-local non-contiguous with the document data object.

20. The apparatus of claim 19, wherein the natural language processing operation comprises at least one of coreference resolution, paraphrase detection, word sense disambiguation, entity and event resolution, opinion mining, semantic relatedness, image-sentence ranking, image generation from text, story generation, subjectivity/objectivity classification, or question-type classification.

* * * * *